United States Patent
Cen (10) Patent No.: US 7,822,929 B2
(45) Date of Patent: Oct. 26, 2010

(54) TWO-HOP CACHE COHERENCY PROTOCOL

(75) Inventor: Ling Cen, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/833,963

(22) Filed: Apr. 27, 2004

(65) Prior Publication Data

US 2007/0022252 A1      Jan. 25, 2007

(51) Int. Cl.
    *G06F 12/00*     (2006.01)
(52) U.S. Cl. .............................. 711/141; 711/E12.03
(58) Field of Classification Search ........... 711/141, 711/143; 707/9, 10
    See application file for complete search history.

(56) References Cited

U.S. PATENT DOCUMENTS

| | | | |
|---|---|---|---|
| 5,297,269 A | 3/1994 | Donaldson et al. ........... 395/425 |
| 5,463,629 A | 10/1995 | Ko | |
| 5,557,767 A | 9/1996 | Sukegawa ................... 395/440 |
| 5,623,644 A | 4/1997 | Self et al. | |
| 5,664,149 A | 9/1997 | Martinez, Jr. et al. | |
| 5,812,814 A * | 9/1998 | Sukegawa ................... 711/103 |
| 5,819,296 A | 10/1998 | Anderson et al. ........... 707/204 |
| 5,860,111 A | 1/1999 | Martinez, Jr. et al. | |
| 6,009,488 A | 12/1999 | Kavipurapu | |
| 6,067,611 A | 5/2000 | Carpenter et al. | |
| 6,085,276 A * | 7/2000 | VanDoren et al. ........... 710/240 |
| 6,092,155 A | 7/2000 | Olnowich | |
| 6,189,043 B1 | 2/2001 | Buyukkoc et al. ........... 709/241 |
| 6,263,409 B1 | 7/2001 | Haupt et al. ................ 711/154 |
| 6,275,905 B1 | 8/2001 | Keller et al. ................ 711/141 |
| 6,275,907 B1 | 8/2001 | Baumgartner et al. ....... 711/143 |
| 6,338,122 B1 | 1/2002 | Baumgartner et al. ....... 711/141 |
| 6,341,337 B1 | 1/2002 | Pong | |
| 6,405,289 B1 | 6/2002 | Arimilli et al. | |
| 6,430,657 B1 | 8/2002 | Mittal et al. | |
| 6,442,597 B1 | 8/2002 | Deshpande et al. | |
| 6,477,535 B1 | 11/2002 | Mirzadeh ................... 707/101 |
| 6,478,498 B1 | 11/2002 | Miyasaka et al. ........... 401/215 |
| 6,484,220 B1 | 11/2002 | Alvarez, II et al. ............ 710/46 |
| 6,493,809 B1 | 12/2002 | Safranek et al. | |
| 6,578,116 B2 | 6/2003 | Bachand et al. | |
| 6,594,733 B1 | 7/2003 | Cardente | |
| 6,631,447 B1 | 10/2003 | Morioka et al. ............. 711/141 |
| 6,631,449 B1 | 10/2003 | Borril | |

(Continued)

FOREIGN PATENT DOCUMENTS

EP      1582983      5/2005

(Continued)

OTHER PUBLICATIONS

Gabriele Sartori, President HyperTransport Technology Consortium, Alter, HyperTransport Technology.

(Continued)

*Primary Examiner*—Matt Kim
*Assistant Examiner*—Hamdy S Ahmed
(74) *Attorney, Agent, or Firm*—Blakely, Sokoloff, Taylor & Zafman LLP (57) ABSTRACT

The invention facilitates a distributed cache coherency conflict resolution in a multi-node system to resolve conflicts at a home node.

4 Claims, 6 Drawing Sheets

U.S. PATENT DOCUMENTS

| | | | |
|---|---|---|---|
| 6,636,944 B1 | 10/2003 | Gilbert et al. | |
| 6,640,287 B2 | 10/2003 | Gharachorloo et al. | 711/141 |
| 6,691,192 B2 | 2/2004 | Ajanovic et al. | |
| 6,728,841 B2 | 4/2004 | Keller | 711/146 |
| 6,760,728 B1 | 7/2004 | Osborn | |
| 6,769,017 B1 | 7/2004 | Bhat et al. | 709/214 |
| 6,795,900 B1 | 9/2004 | Miller et al. | 711/145 |
| 6,826,591 B2 | 11/2004 | French et al. | |
| 6,874,053 B2 | 3/2005 | Yasuda et al. | 710/305 |
| 6,877,026 B2 | 4/2005 | Smith et al. | |
| 6,877,030 B2 | 4/2005 | Deneroff | 709/213 |
| 6,901,485 B2 | 5/2005 | Arimilli et al. | 711/135 |
| 6,922,755 B1 | 7/2005 | Safranek et al. | |
| 6,926,591 B2* | 8/2005 | Horsky et al. | 451/49 |
| 6,934,814 B2 | 8/2005 | Glasco et al. | |
| 6,941,440 B2 | 9/2005 | Moll et al. | |
| 6,944,719 B2 | 9/2005 | Rowlands et al. | |
| 6,954,829 B2 | 10/2005 | Hum et al. | |
| 6,968,425 B2 | 11/2005 | Hashimoto | |
| 7,062,541 B1 | 6/2006 | Cannon et al. | |
| 7,111,128 B2 | 9/2006 | Hum et al. | |
| 7,130,969 B2 | 10/2006 | Hum et al. | |
| 7,209,976 B2 | 4/2007 | Folkes et al. | |
| 7,269,698 B2 | 9/2007 | Hum et al. | |
| 7,360,033 B2 | 4/2008 | Hum et al. | |
| 2002/0087809 A1 | 7/2002 | Arimilli et al. | 711/144 |
| 2002/0129211 A1 | 9/2002 | Arimilli et al. | |
| 2002/0178210 A1 | 11/2002 | Khare et al. | |
| 2003/0074430 A1 | 4/2003 | Gieseke et al. | |
| 2003/0097529 A1* | 5/2003 | Arimilli et al. | 711/141 |
| 2004/0068620 A1* | 4/2004 | Van Doren et al. | 711/144 |
| 2004/0122966 A1* | 6/2004 | Hum et al. | 709/232 |
| 2004/0123045 A1* | 6/2004 | Hum et al. | 711/141 |
| 2004/0123052 A1* | 6/2004 | Beers et al. | 711/150 |
| 2005/0160231 A1* | 7/2005 | Doren et al. | 711/141 |
| 2005/0198440 A1* | 9/2005 | Van Doren et al. | 711/141 |

FOREIGN PATENT DOCUMENTS

| | | |
|---|---|---|
| EP | 1443404 | 3/2007 |

OTHER PUBLICATIONS

Gabriele Sartori, Director Technology Evangelism, AMD, HyperTransport Technology Overview & Consortium Announcement, Platform Conference.

Wikipedia, "*Dynamic Random Access Memory*," Revision as of Mar. 31, 2003, http://en.wikipedia.org/wiki/Dynamic_access_memory.

Office Action from U.S. Appl. No. 11/447,384 mailed Aug. 22, 2006, 8 pgs.

Ahmed, Hamdy S., "P15925 Office Action", (Dec. 26, 2006),12 pages.

Tendler, et al., Tendler et al., *Power4 System Microarchecture Technical White Paper, IBM Server Group*, Oct. 2001, pp. 1-6.

Rajwar, R., et al., "Improving the throughput of synchronization by insertion of delays," High-Performance Computer Architecture, IEEE Computer SOC, pp. 168-179 (Jan. 8, 2000).

Ender, Bilir E., et al., "Multicast Snooping: A New Coherence Method Using a Multicast Address Network," Computer Architecture News, pp. 294-304, (May 1999).

Azimi, M., et al., "Scalability port: a coherent interface for shared memory multiprocessors," High Performance Interconnects, IEEE, pp. 65-70 (Aug. 21, 2002).

Lilja, DJ, "Cache Coherence in Large-Scale Shared-Memory Multiprocessors: Issues and Comparisions," ACM Computing Surveys, pp. 303-338 (Sep. 2003).

PCT Search Report from PCT/US03/37782, Jan. 9, 2006.

Handy, Jim, "The Cache Memory Book," Second Edition, 1998, p. vii-229, Academic Press Limited, London United Kingdom.

"IEEE Standard for Scalable Coherent Interface (SCI)," IEEE Std 1596-1992, 1992, pp. i-243, Institute of Electrical and Electronics Engineers, Inc., USA.

"UltraSPARC User's Manual, UltraSPARC-1, UltraSPARC-II," Jul. 1997, pp. iii-394, Sun Microsystems, USA.

Office Action from U.S. Appl. No. 10/325,427 mailed Dec. 4, 2006, 12 pgs.

International Search Report and Written Opinion from PCT/US2005/012087 mailed Oct. 28, 2005, 18 pgs.

International Preliminary Report on Patentability from PCT/US2005/012087 mailed Nov. 9, 2006, 12 pgs.

Final Office Action from U.S. Appl. No. 10/833,965 mailed May 31, 2007, 22 pgs.

Office Action from U.S. Appl. No. 10/325,427 mailed May 1, 2007, 13 pgs.

Office Action from U.S. Appl. No. 10/833,965 mailed Sep. 21, 2007, 14 pgs.

Office Action from U.S. Appl. No. 10/833,977 mailed Oct. 9, 2007, 8 pgs.

Office Action from U.S. Appl. No. 10/833,963 mailed Dec. 17, 2007, 12 pgs.

Notice of Allowance for U.S. Appl. No. 11/069,848 mailed May 8, 2008, 10 pgs.

Notice of Allowance for U.S. Appl. No. 11/447,384 mailed Nov. 28, 2007, 6 pgs.

Notice of Allowance for U.S. Appl. No. 11/482,673 mailed Apr. 8, 2008, 7 pgs.

Notice of Allowance for U.S. Appl. No. 11/069,848 mailed May 8, 2007, 10 pgs.

Combined Search and Examination Report for GB Patent Application No. GB0802718.7 mailed Jun. 30, 2008, 7 pgs.

Notice of Preliminary Rejection for Korean Patent Application No. 10-2006-7022561 mailed Nov. 21, 2007, 4 pgs.

Notice of Preliminary Rejection for Korean Patent Application No. 10-2006-7022561 mailed May 20, 2008, 2 pgs.

Office Action for German Patent Application No. 10393919.9-53 dated Mar. 27, 2009; 3 pages.

Final Office Action from U.S. Appl. No. 10/833,965 mailed Mar. 19, 2009, 16 pgs.

Final Office Action from U.S. Appl. No. 10/833,977 mailed Jun. 23, 2009, 11 pgs.

Office Action from U.S. Appl. No. 10/325,427 mailed May 27, 2009, 17 pgs.

Office Action for German Patent Application No. 11 2005 000 974.2-53 mailed Apr. 2, 2009, 4 pgs.

Final Office Action from U.S. Appl. No. 10/325,427 mailed Dec. 8, 2008, 16 pgs.

European Search Report for EP Patent App No. EP03257787 Mailed Feb. 23, 2007, 35 Pages.

Lenoski, Daniel, et al., "The Directory-Based Cache Coherence Protocol for the DASH Multiprocessor", Computer Architecture, 1990 Proceedings. 17th Annual International, May 28-31, 1990, pp. 148-159.

Final Office Action from U.S. Appl. No. 10/325,427 mailed Jan. 12, 2010, 11 pgs.

Office Action for Japanese Patent Application No. P2007-509505 mailed Feb. 15, 2010, 20 pgs.

\* cited by examiner

BASIC READ TRANSACTION

FIG. 1

WRITEBACK RACE/CONFLICT

Writeback is sent on home channel and does not block PRIL at node C

TWO-HOP CACHE COHERENCY PROTOCOL

RELATED APPLICATIONS

The present U.S. patent application is related to application Ser. No. 10/325,427, filed Dec. 19, 2002, entitled "SPECULATIVE DISTRIBUTED CONFLICT RESOLUTION FOR A CACH COHERENCY PROTOCOL"

FIELD

The invention relates to cache memories. More particularly, the invention relates to distributed conflict resolution in a multi-cache multiprocessor system.

BACKGROUND

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases, reliance on a single component for conflict resolution can decrease overall system performance.

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides. SCI, for example, uses this scheme, with each node that contains a cached copy maintaining links to other nodes with cached copies, thus collectively maintaining a complete directory.

Snooping schemes rely on broadcast, because there is no single place where the meta-information is held, so all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are inherently more scalable, but require more complex responses, often involving three nodes in point-to-point communications.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for distributed cache coherency conflict resolution in a multi-node system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used.

The home node as depicted in the following figures serves as the home node for the data to be requested, which means that home node is associated with non-cache memory (e.g., main memory) in which the data to be requested is stored when not cached. For example, the home node can be a processor, cache memory and random access memory (RAM), where the RAM provides a non-cached storage location for the data.

The claimed subject matter facilitates distributed cache coherency conflict resolution in a multi-node system. In one embodiment, the conflict resolution is resolved at a home node. In one aspect, the claimed subject matter facilitates the conflict resolution protocol that is efficient with respect to the number of messages communicated between the nodes. For example, the nodes may be classified as follows: a source node, home node and peer node. The claimed subject matter describes a protocol for a source node and home node. In one embodiment, the claimed subject matter utilizes a peer node protocol as discussed with respect to the related application. An algorithm for a source node will be discussed in connection with FIG. 5. Likewise, an algorithm for a home node will be discussed in connection with FIG. 6.

Request Messages

The following messages are requests for data/action from a requesting node.

Port Read Invalidate Line (PRIL): This is a request for a copy of a data segment where the provider node's copy of the data is invalidated. This message can also be referred to as a "request for ownership." In one embodiment, the PRIL is broadcast to all nodes, including the home node.

Port Write Line (PWL): This message causes data (e.g., a modified cache line) to be written to memory, therefore, a writeback line. This message can also referred to as a "dirty eviction." In one embodiment, the PWL is sent to the home node.

Response Messages

The following messages are messages from Peer (i.e., Non-Home) nodes to the requesting node in response to the requests described above.

Exclusive Data (E_DATA)—This message is a response to a request (PRIL) when the node sending the response has an exclusive copy of the requested data. In one embodiment, the node forwards the exclusive copy of the data to the requesting node.

Messages to Home Node

These messages are transmitted to the Home node by a Peer node.

Invalid State Acknowledgement (I_ACK): This message is a response to a request (PRIL, and PWL) when the node sending the response has an invalid copy of the requested data or no copy of the requested data.

Exclusive State Acknowledgement (E_ACK): This message is a response to a request (PRIL and PWL) when the node sending the response has an exclusive copy of the requested data or no copy of the requested data.

Acknowledgement of Data Received (DACK): This message is sent by a requesting node to the home node.

I_ACK_Conflict: This message indicates that there is a copending request for the requested cache line.

Messages from the Home Node

These messages are sent from the Home node to the Peer and/or Requesting nodes.

Exclusive Completion (E_CMP): This message indicates the completion of the requesting node's request with the exclusive cache state because the requesting node has received the exclusive data. In one embodiment, the home node de-allocates the line after issuing this message.

Invalid Data Completion (I_DATA_CMP) This message includes the requested data to be sent to the requesting node and indicates the completion of the requesting node's PRIL request with "Invalid" cache status.

Completion (CMP)—This message is sent to the node that requested a PWL to indicate completion of the writeback of the modified data to memory.

I_CMP—This message is sent to one of the two nodes for a conflict condition to indicate the conflict line is deallocated.

XFER_(NodeID): This message causes the receiving node to transfer data to the node indicated in the message. The home node sends this message to the current owner of requested data when the home node is informed of a conflict condition requiring that the current owner of the data transfer the data to the target node. A XFRI message is sent instead of a XFR message if the home node determines that an unresolved conflicting request is a PRIL message, meaning that the current owner must invalidate the line when initiating the data transfer E_CMP_XFER(NodeID)): E_CMP_XFER is a composite message that is made of E_CMP and the XFER message. Therefore, this message indicates that this transaction is done at home node and also causes the receiving node to transfer data to the node indicated in the message. The home node sends this message to the current owner of requested data when the home node is informed of a conflict condition requiring that the current owner of the data transfer the data to the target node.

This marks the end of the discussion of messages from and to the home node and requesting nodes.

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used. In the examples that follow, the number preceding the message indicates relative time (a message that starts with a "1" is sent before a message that starts with "1.1" or "2" or "3", etc . . . For example, the number denotes rough time sequence between two nodes. However, the number can not be used to determine timing between different pairs of nodes. For example, a "4" between nodes A and B may be ahead of a "2" between nodes C and D. Also, a message with a dashed line indicates an in-order home channel. For example, a in-order home channel may be between the same pair of nodes in a similar direction to insure that a first message from a requesting node that was sent before a second message from the same requesting node is received in that order (first message is received first by the receiving node and the second message is subsequently received by the receiving node).

Figure 1:
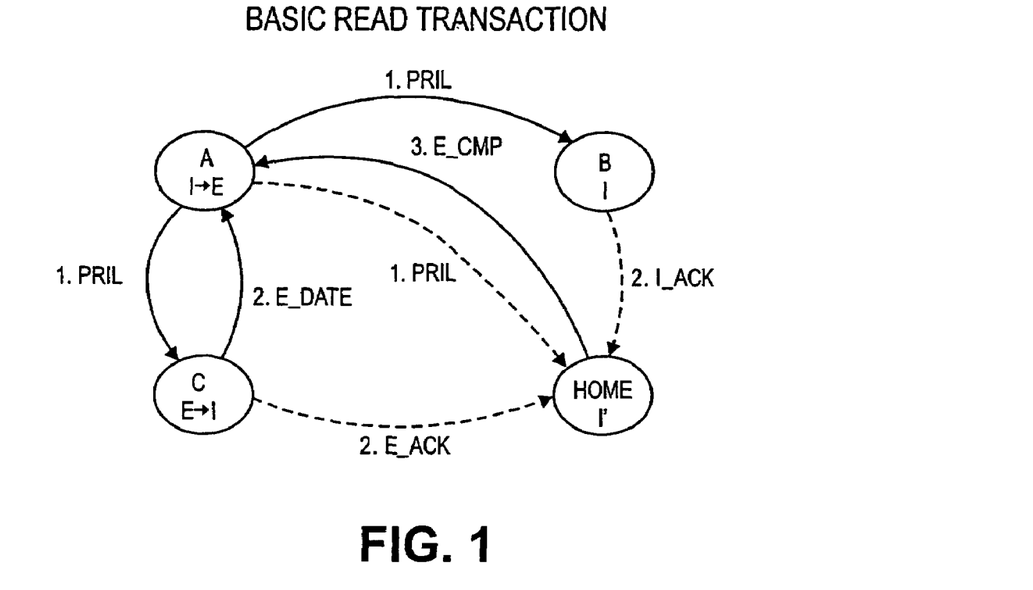
FIG. 1 provides one embodiment of a conceptual illustration of a protocol to support a read transaction.

FIG. 1 provides one embodiment of a conceptual illustration of a protocol to support a read transaction. In this embodiment, a plurality of nodes A, B, and C, is coupled to a home node, H. Obviously, the claimed subject matter is not limited to the three nodes and may allow for different amounts of nodes.

In one aspect, the figure depicts a read transaction. Initially, the states of the nodes are as follows. Nodes A and B have an invalid copy of the data. In contrast, Node C has an exclusive copy of the data (this is also depicted in the Figure as the first state of the node (I for invalid, E for exclusive).

First, the requesting node A issues a PRIL request to nodes B, C, and the Home node. In one embodiment, the PRIL request is communicated to the home node with an in-order home channel.

Second, Node C responds to node A's PRIL request with an E_DATA and returns the exclusive copy of the data. Likewise, Node C responds to the Home node with an E_ACK to indicate that node C has forwarded an exclusive copy of the requested data. Meanwhile, node B forwards an I_ACK to indicate it has an invalid copy of the requested data.

Consequently, the home node issues an E_CMP to Node A to indicate the completion of Node A's request for the exclusive data because the requesting node has received the exclusive data. In one embodiment, the home node de-allocates the line after issuing this message. Therefore, the home node supervises and controls the read transaction based on the received messages from the other nodes.

Figure 2:
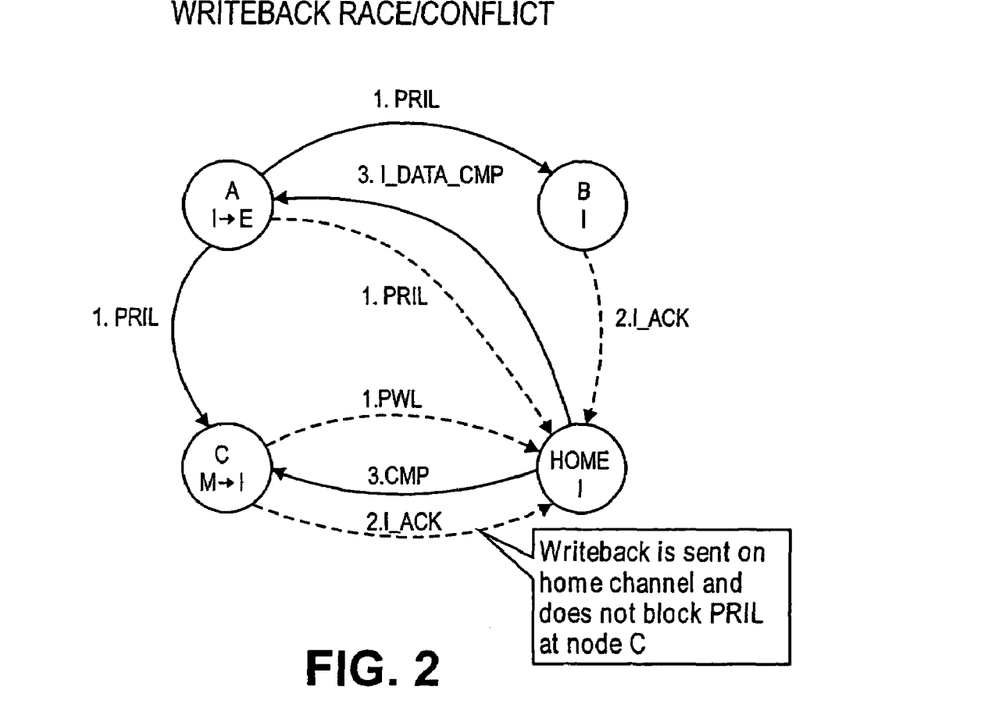
FIG. 2 provides one embodiment of a conceptual illustration of protocol to support a writeback race conflict.

FIG. 2 provides one embodiment of a conceptual illustration of protocol to support a writeback race conflict. In this embodiment, a plurality of nodes A, B, and C, is coupled to a home node, H. Obviously, the claimed subject matter is not limited to the three nodes and may allow for different amounts of nodes.

In one aspect, the figure depicts a writeback race conflict. Initially, the states of the nodes are as follows. Nodes A and B have an invalid copy of the data. In contrast, Node C has a modified copy of the data (this is also depicted in the Figure as the first state of the node (I for invalid, M for modified).

First, the requesting node A issues a PRIL request to nodes A, B, and the Home node. In one embodiment, the PRIL request is communicated to the home node with an in-order home channel. Meanwhile, node C issues a PWL request to the Home node for a writeback of the modified data to memory. In one embodiment, the PRIL request is communicated to the home node with an in-order home channel. Therefore, a writeback race conflict exists due to A's request for the modified data that conflicts with C's PWL (writeback) request. In one embodiment, the writeback is sent on a home channel and does not block A's PRIL request at node C.

Second, Nodes C and B issue an I_ACK message in response to A's PRIL request. The I_ACK message is sent to the Home node as a response to A's PRIL request to indicate that they have an invalid copy of the requested data or no copy of the requested data.

The home node will resolve the conflict. First, the home node responds to C's PWL request and A's PRIL request upon receiving the I_ACK messages from nodes B and C. The home node responds with a CMP message to node C to indicate completion of the writeback of the modified data to memory. Also, the home node responds to Node A with an I_DATA_CMP message that includes the requested data and indicates the completion of node A's PRIL request.

Figure 3:
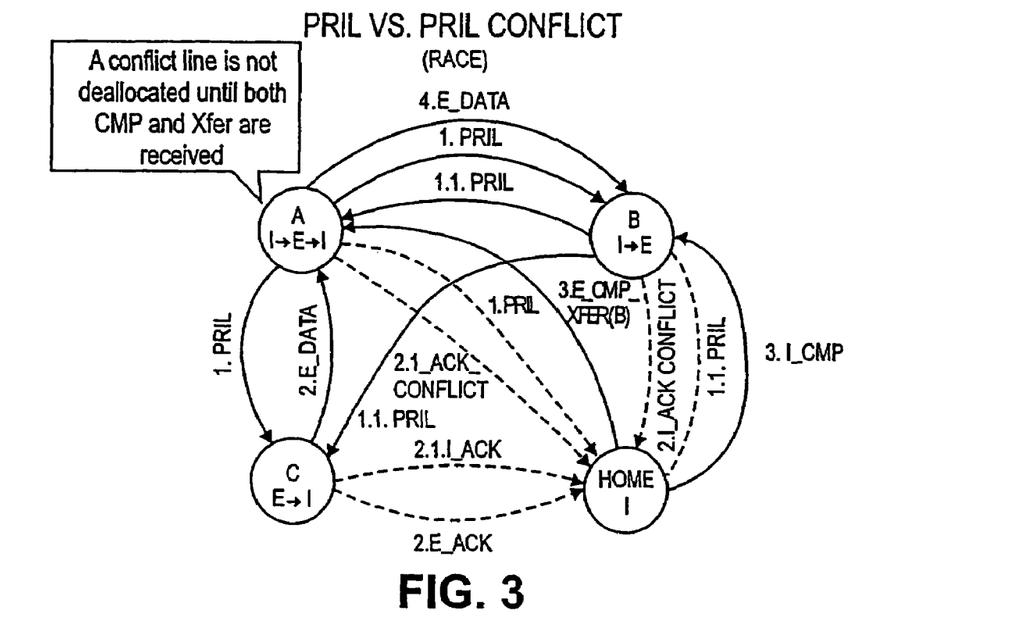
FIG. 3 provides one embodiment of a conceptual illustration of a protocol to support race conflict for request for ownership between two requests.

FIG. 3 provides one embodiment of a conceptual illustration of a protocol to support race conflict for request for ownership between two requests. For example, the illustration depicts a protocol to support a shared line conflict caused by requests issuing at approximately the same time. First, node A transmits PRIL messages requesting a block of data to nodes B and C and to home node 240. In one embodiment, the PRIL message is sent to the home node via an in-order home channel. Some short period of time later, or even at the same time, node B sends PRIL messages to nodes A, C and to home node requesting the same block of data. In one embodiment, the PRIL message is sent to the home node via an in-order home channel Presently, there are two competing PRIL requests, one from node A and one from Node B. We will first explain the processing for A's PRIL request in this paragraph, followed by the processing for B's PRIL request in the next paragraph.

Node A and Node B both will send a I_ACK_Conflict message to the home node to indicate there is a copending request for the requested cache line.

For A's PRIL request, node C sends an E_Data message to node A as a response to Node A's PRIL request to indicate that Node C has an exclusive copy of the requested data. Also, in one embodiment, Node C forwards the exclusive copy of the data to Node A. Meanwhile, node C sends an E_ACK message to the home node to indicate it has forwarded an exclusive copy of the requested data. In one embodiment, the E_ACK message is sent to the home node via an in-order home channel.

For B's PRIL request, node C sends an I_ACK to the home node since it invalidated the requested data after sending the exclusive copy of the data to Node A.

Hence, the home node resolves the copending PRIL requests by issuing an I_CMP message to Node B and by issuing an E_CMP_XFER(B) message to Node A. The E_CMP_XFER(B) message causes the receiving node, node A, to transfer the exclusive copy of data to the node indicated in the message, node B. The home node sends this message to the current owner of requested data, node A in this example, when the home node is informed of a conflict condition requiring that the current owner of the data transfer the data to the target node, node B in this example.

Consequently, node A transfers an exclusive copy of the data to Node B after receiving the E_CMP_XFER(B) message by sending an E_DATA message to Node B.

Figure 4:
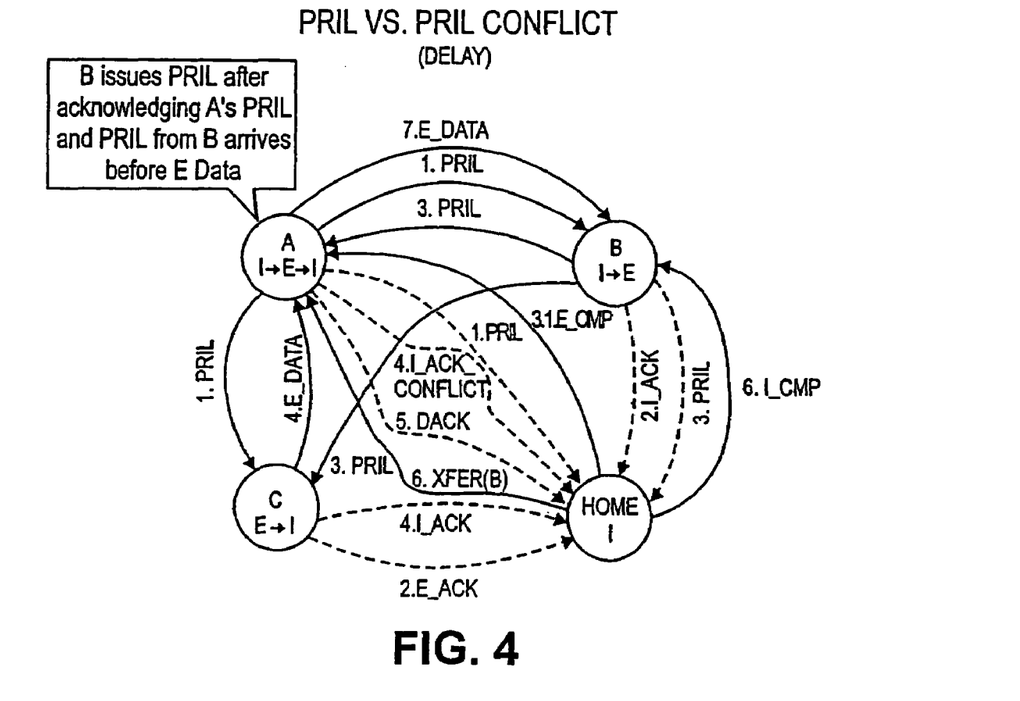
FIG. 4 provides one embodiment of a conceptual illustration of a protocol to support a delay conflict for request for ownership between two requests.

FIG. 4 provides one embodiment of a conceptual illustration of a protocol to support a delay conflict for request for ownership between two requests. For example, node A transmits a PRIL message to nodes B, C, and to home node requesting a block of data. A delay conflict can arise if node B issues a PRIL request after acknowledging A's PRIL request.

First, the requesting node A issues a PRIL request to nodes B, C, and the Home node. In one embodiment, the PRIL request is communicated to the home node with an in-order home channel.

Second, Node C responds to A's PRIL with an E_ACK to the Home node to indicate that node C has forwarded an exclusive copy of the requested data. Meanwhile, node B responds to A's PRIL with an I_ACK to indicate it has an invalid copy of the requested data.

Third, Node B issues a PRIL request to nodes B, C, and the Home node. In one embodiment, the PRIL request is communicated to the home node with an in-order home channel.

Fourth, Node C responds to A's PRIL request with an E_DATA, Also, node C responds to B's PRIL with an I_Ack message to the home node. Meanwhile, node A responds to B's PRIL with an I_Ack_Conflict message to the home node.

Fifth, the Home node sends an E_CMP to Node A despite the fact that there is a conflict. Ideally when a conflict is detected, a XFER message is attached with CMP, just like FIG. 3. This does not happen because when the Home node collects all the responses for A's PRIL, there is no indication of conflict. The conflict indicator I_Ack_Conflict (A's response to B's PRIL) is still in flight and have not been received by the Home node. In this case, node A sends a DACK message to the home node upon receiving the E_CMP from the Home node to indicate that node A is the owner of the line and the home node has missed a conflict and needs to send a Xfer command because DACK is sent on the in-order Home channel, it will push the I_Ack_Conflict ahead of it which is also sent on the same Home channel. In one embodiment, the DACK message is communicated to the home node with an in-order home channel.

Hence, the home node resolves the delay conflict between two requesters by first receiving DACK and then issuing an I_CMP message to node B and an Xfer(B) message to node A. The XFER(B) message causes the receiving node, node A, to transfer the exclusive copy of data to the node indicated in the message, node B. The home node sends this message to the current owner of requested data, node A in this example, when the home node is informed of a conflict condition requiring that the current owner of the data transfer the data to the target node, node B in this example. Consequently, upon receiving the Xfer(B) message from the home node, node A sends the exclusive copy of the data to node B with an E_Data message.

Figure 5:
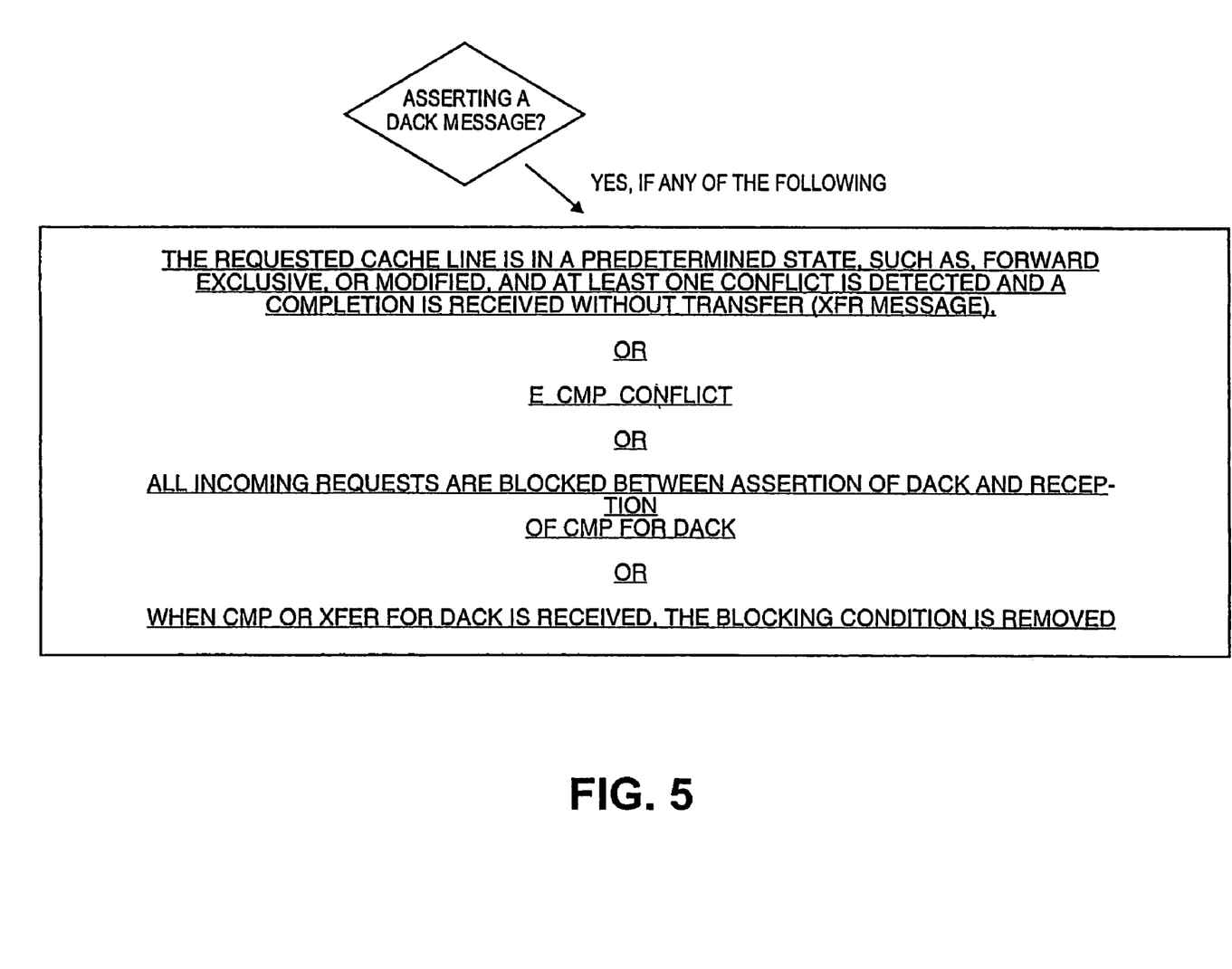
FIG. 5 is one embodiment of a flowchart for a method of a source node algorithm

FIG. 5 is one embodiment of a flowchart for a method of a source node algorithm. As previously discussed, the nodes may be classified as follows: a source node, home node and peer node. The claimed subject matter describes the algorithm used at the source node. In one embodiment, the claimed subject matter utilizes a peer node protocol as discussed with respect to the related application.

FIG. 5 depicts one method for a source node algorithm. For example, the following conditions may result in asserting a Dack message.

In one embodiment, one condition to assert Dack is the requested cache line is in a predetermined state, such as, forward, exclusive, or modified, and at least one conflict is detected and a completion is received without transfer (Xfr message).

In another embodiment, the protocol may be modified such that during conflict every transaction in the conflict chain will be required to go through DACK phase. In other words, the E_CMP_XFER in FIG. 3 will be changed to E_CMP_Conflict. Upon receiving E_CMP_Conflict (a conflict completion), node A will issue DACK to the Home node. The Home node will issue XFER after receiving DACK. This may simplify hardware implementation because it allows the conflict processing flow to be relatively similar for FIGS. 3 and 4. However, it utilizes DACK for all conflicts, which slows down conflict resolution a bit. This usually is not an issue due to the rarity of conflicts In one embodiment, all incoming requests are blocked between assertion of DACK and reception of CMP for DACK. This facilitates the Home node in determining whether the end of conflict chain is reached In one embodiment, when CMP or XFER for DACK is received, the blocking condition is removed. The node will behave like a peer node.

Figure 6:
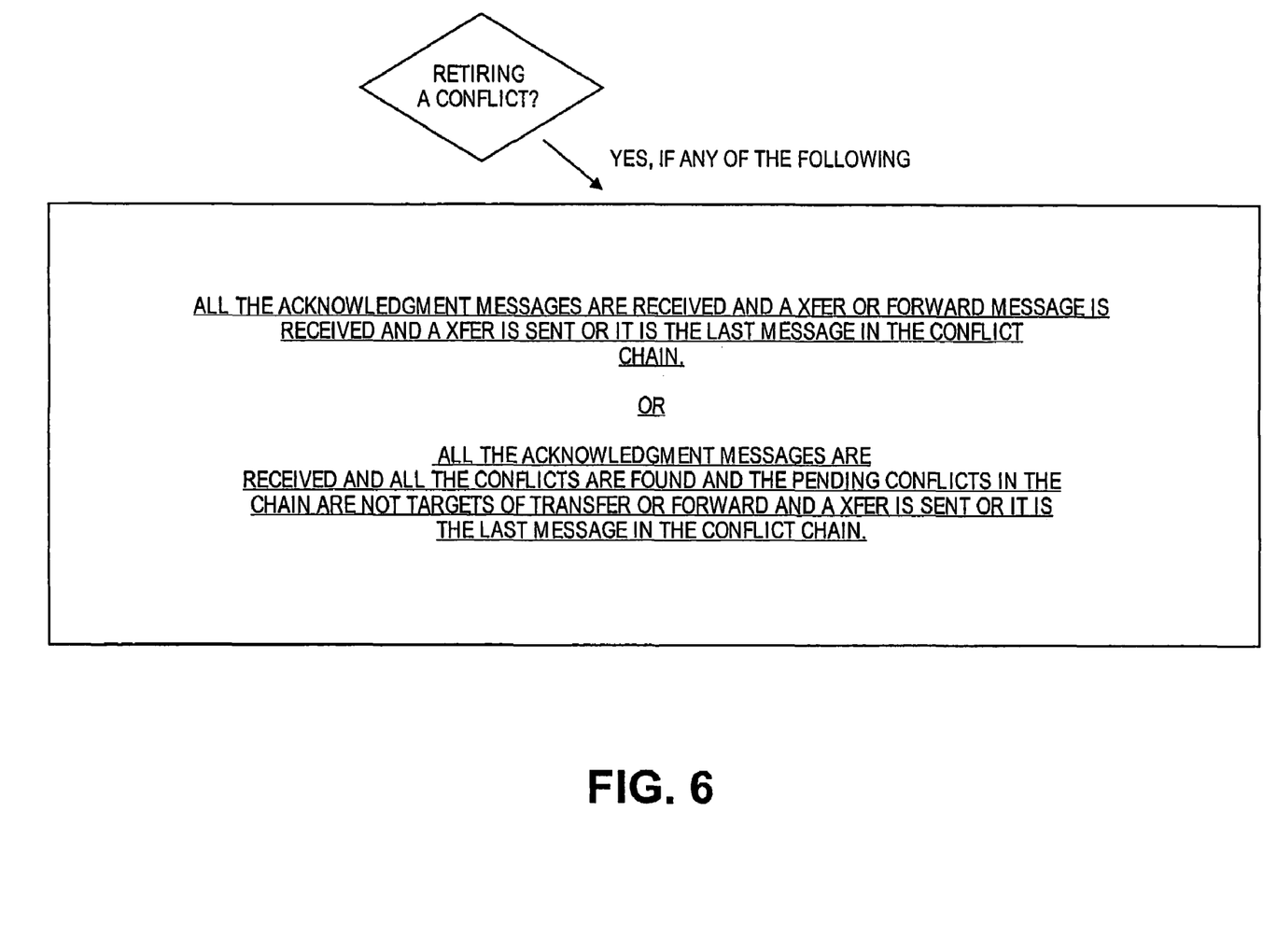
FIG. 6 is one embodiment of a flowchart for a method of a home node algorithm

FIG. 6 is one embodiment of a flowchart for a method of a home node algorithm. As previously discussed, the nodes may be classified as follows: a source node, home node and peer node. The claimed subject matter describes a protocol for a source node and home node. In one embodiment, the claimed subject matter utilizes a peer node protocol as discussed with respect to the related application.

FIG. 6 depicts one method for a home node algorithm. For example, the home node algorithm may be used to resolve conflicts between the other nodes.

For example, in one embodiment, the following conditions/events are used to retire a conflict. The home node will retire (end) a conflict request and remove the conflictor from the conflict chain if all the acknowledgement messages are received and
a Xfer or Forward message is received and
an Xfer is sent OR it is the last message in the conflict chain.

Alternatively, in another embodiment, the following conditions/events are used to retire a conflict:

all the acknowledgement messages are received and
all the conflicts are found and
the pending conflicts in the chain are not targets of transfer or forward and
an Xfer is sent OR it is the last message in the conflict chain.

Also, the home node algorithm may supervise and determine the format and recording of conflict messages. For example, the conflict messages from a node may just contain the transaction ID of the original transaction. Alternatively, in another embodiment, the conflict messages from a node may contain the transaction ID of the original transaction and the transaction ID of conflicting transaction. The two transaction ID's can be used to build a link list of conflicts. Because both the original and the conflicting transaction ID's are present, the conflict chain can be recorded at both transactions' respective recording entry. Just like YAP (patent number ???), this protocol requires a substantial recording table to store each transaction in flight. When a request arrives at the home node, it can simply look up the conflict chain to find all the conflicts without requiring a slow and costly address CAM. For example, I_Ack from C to Home in FIG. 2 is optimized to I_Ack_Conflict. This I_Ack_Conflict has A's PRIL transaction ID (original) and PWL transaction ID (conflictor). When A's PRIL arrives at Home, instead of a slow and costly address CAM search, it can simply use PWL's transaction ID, which is recorded from the I_Ack_Conflict, to find the PWL recording entry.

EXAMPLE SYSTEMS TO SUPPORT DISTRIBUTED CACHE COHERENCY CONFLICT RESOLUTION

Figure 7:
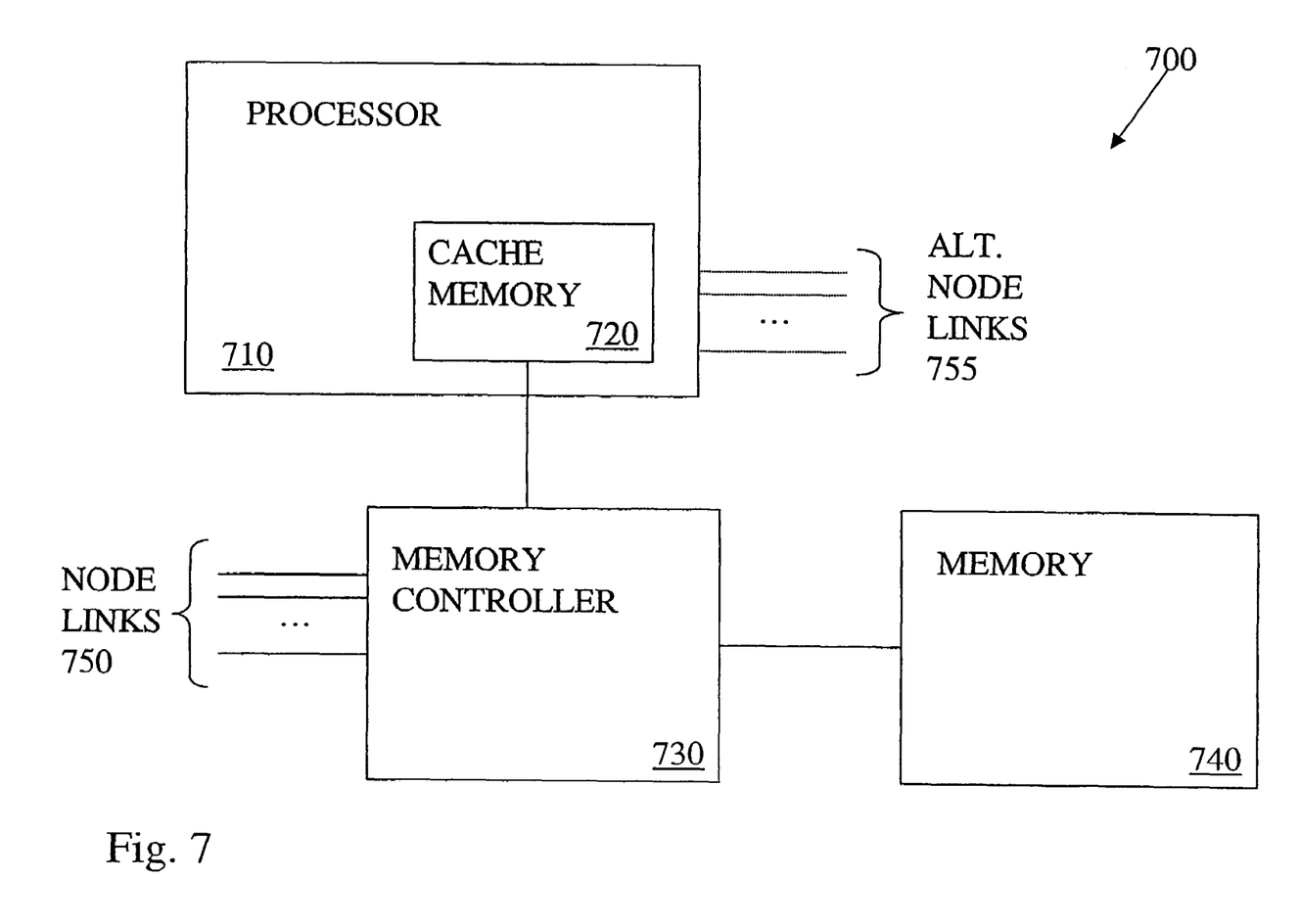
FIG. 7 is a block diagram of one embodiment of a node.

FIG. 7 is a block diagram of one embodiment of a node. Node 700 is illustrated with a single processor, cache memory, memory controller and memory; however, any number of any of these components can be included in a node. Further, additional and/or different components (e.g., a bus bridge) can also be included in a node.

Processor 710 can be any type of processor known in the art. In one embodiment, processor 710 includes cache memory 720. In alternate embodiments, cache memory 720 is external to processor 710, or additional cache memories can be included that are internal or external to processor 710.

Memory controller 730 is coupled with cache memory 720 and memory 740. Memory controller 730 operates as an interface between cache memory 720 and memory 740. In one embodiment, memory controller 730 maintains cache coherency according to the cache coherency protocol described herein. Memory controller 730 interacts with other nodes via node links 750. In an alternate embodiment, processor 710 interacts with memory controller 730 to maintain cache coherency as described herein and processor 710 interacts with other nodes via alternative node links 755.

In one embodiment, node links 750 include a dedicated interface for each node with which node 700 interacts. In an alternate embodiment, node links 750 include a number of interfaces that is different than the number of nodes with which node 700 interacts. In one embodiment, node 700 interacts with one or more agents that represent multiple nodes.

Figure 8:
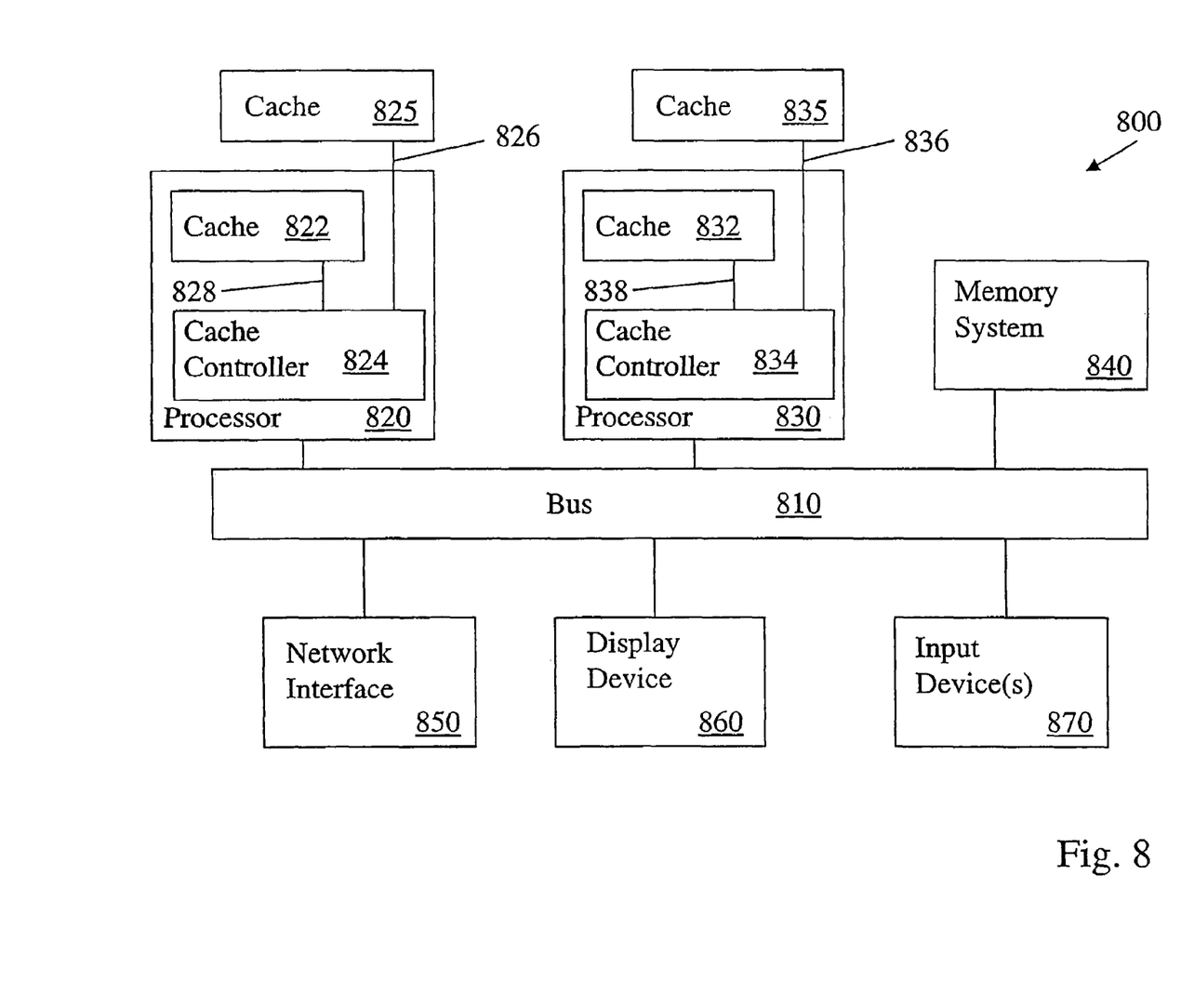
FIG. 8 is one embodiment of a multiprocessor system.

FIG. 8 is one embodiment of a multiprocessor system. Multiprocessor system 800 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Multiprocessor system 800 can be configured to operate as a multi-node system.

Multiprocessor system 800 includes bus system 810 or other communication device(s) to communicate information. Bus system 810 can include any number of buses and associated interconnection circuitry, for example, bus bridges. Processor 820 is coupled with bus system 810 to process information. Processor 820 can include cache memory 822, for example a level zero (L0) cache memory, and cache controller 824. In one embodiment, processor 820 is also coupled with cache 825, which can be any type of cache memory. In an alternate embodiment, cache 825 can be coupled with bus system 810. Other types of processor-cache configurations can also be used.

In one embodiment, cache controller 824 is coupled with cache memory 822 via cache memory interface 828, which can be, for example, a bus internal to processor 820. Cache controller is coupled with cache memory 825 via cache interface 826, which provides an interface between processor 820 and an external cache memory.

Multiprocessor system 800 further includes processor 830 with cache memory 832 and cache controller 834. Cache controller 834 is coupled with cache memory 832 via cache interface 838. Similarly, cache controller 834 is coupled with cache memory 835 via cache interface 836. In one embodiment, cache memory 835 is coupled with processor 830.

While multiprocessor system 800 is illustrated with two processors, multiprocessor system 800 can include any number of processors and/or co-processors. Multiprocessor system 800 further includes memory system 840 coupled with bus system 810. Memory system 840 can include any combination of dynamic (e.g., random access memory) and static (e.g., read-only memory, CD-ROM, disk storage, flash memory) memory devices and associated drives, where appropriate. The memory devices of memory system 840 are used to store information and instructions to be executed by processors of multiprocessor system 800. Memory system 840 also can be used to store temporary variables or other intermediate information during execution of instructions by the processors.

Instructions can be provided to memory system 840 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 800 further includes network interface 850 to provide access to a network, such as a local area network and/or the Internet. Network interface 850 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by an electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 800 can also include display device 860, such as a cathode ray tube (CRT) or liquid crystal display (LCD), to display information. Input device(s) 870, including, for example, a keyboard having alphanumeric and other keys, is typically coupled to bus 810 to communicate information and command selections to processors 820 and/or 830. Another type of user input device is a cursor control device, such as a mouse, a trackball, or cursor direction keys to communicate direction information and command selections to processors 820 and 830 and to control cursor movement on display device 860.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    transmitting, from a first peer node, a request for a copy of a block of data to multiple nodes in a multi-node system including a home node that maintains a linked list of conflicts based on transaction identifiers associated with respective requests, wherein the home node includes non-cache memory in which the block of data is stored when not cached;
    transmitting, from a second peer node, a request for a copy of the block of data to the multiple nodes including the home node;
    transmitting, from a third peer node, the copy of the block of data to the first peer node and an acknowledgement to a home node and, if any, subsequent conflicting requests;
    blocking, by the first peer node, incoming requests in response to an acknowledgement of data received message until receiving a completion message; and
    transmitting, by the first peer node, a copy of the block of data to cause the second peer node to store the data in an Exclusive state in response to a command from the home node, the command also being an explicit completion command, wherein the home node sends the command in response to receiving the request from the first peer node and the request from the second peer node and determining that the request are conflicting wherein transmitting, from a first peer node, a request for a copy of a block of data to multiple nodes comprises transmitting the request from the first node to the home node via an in-order home channel.

2. The method of claim 1 wherein the copy of a block of data sent from the second peer node to the first peer node is an exclusive copy of a block of data.

3. A method comprising:
    transmitting, from a first peer node, a request for a copy of a block of data to multiple nodes in a multi-node system including a home node that maintains a linked list of conflicts based on transaction identifiers associated with respective requests, wherein the home node includes non-cache memory in which the block of data is stored when not cached wherein transmitting, from a first peer node, a request for a copy of a block of data to multiple nodes comprises transmitting the request from the first node to the home node via an in-order home channel;

transmitting, from a second peer node, a request for a copy of the block of data to the multiple nodes including the home node;

transmitting, from a third peer node, the copy of the block of data to the first peer node and an acknowledgement to a home node and, if any, subsequent conflicting requests;

blocking, by the first peer node, incoming requests in response to an acknowledgement of data received message until receiving a completion message; and transmitting, from the home node, the completion message combined with a transfer message to the first node to indicate completion of the request from the first peer node the message also to cause the first peer node to send a copy of the block of data to the second peer node to be stored in an Exclusive state, and de-allocating a cache line associated with the copy of a block of data.

4. The method of claim 3 wherein the copy of a block of data sent from the second peer node to the first peer node is an exclusive copy of a block of data.

* * * * *